(12) United States Patent
Hassan et al.

(10) Patent No.: US 8,346,900 B2
(45) Date of Patent: Jan. 1, 2013

(54) NETWORK SERVICE FOR MODULARLY CONSTRUCTING A SOFTWARE DEFINED RADIO

(75) Inventors: Amer A. Hassan, Kirkland, WA (US); Christian Huitema, Clyde Hill, WA (US); Vishesh M. Parikh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 12/749,955

(22) Filed: Mar. 30, 2010

(65) Prior Publication Data
US 2010/0185541 A1   Jul. 22, 2010

Related U.S. Application Data

(63) Continuation of application No. 11/239,782, filed on Sep. 30, 2005, now Pat. No. 7,784,029.

(51) Int. Cl.
*G06F 15/177* (2006.01)

(52) U.S. Cl. ........................................ 709/220; 709/221

(58) Field of Classification Search .................... 709/220
See application file for complete search history.

(56) References Cited

U.S. PATENT DOCUMENTS

| | | | |
|---|---|---|---|
| 5,388,211 A | 2/1995 | Hornbuckle |
| 6,073,214 A | 6/2000 | Fawcett |
| 6,282,709 B1 | 8/2001 | Reha et al. |
| 6,381,742 B2 | 4/2002 | Forbes et al. |
| 6,430,738 B1 | 8/2002 | Gross et al. |
| 6,823,181 B1 | 11/2004 | Kohno et al. |
| 6,937,877 B2 | 8/2005 | Davenport |
| 7,069,045 B2 | 6/2006 | Wu |
| 7,111,249 B2 | 9/2006 | Kenyon |
| 7,151,925 B2 | 12/2006 | Ting et al. |
| 7,283,838 B2 | 10/2007 | Lu |
| 7,319,870 B2 | 1/2008 | Olson et al. |
| 7,376,721 B2 | 5/2008 | Braun et al. |
| 7,496,739 B1 | 2/2009 | Raghavan et al. |
| 7,784,028 B2 | 8/2010 | Luo et al. |

(Continued)

FOREIGN PATENT DOCUMENTS

DE   19538124 A1   3/1997

(Continued)

OTHER PUBLICATIONS

European Search Report issued on Feb. 13, 2012 for corresponding European Patent Application No. EP 06815961.

(Continued)

*Primary Examiner* — Patrice Winder
*Assistant Examiner* — Joseph Greene (57) ABSTRACT

Systems and methods are provided that disclose a network service for modularly constructing a software defined radio ("SDR"). A server system provides an SDR kernel (i.e., a potentially platform-neutral definition of digital signal processing functionality and control operations necessary to implement the core portion of a software defined radio implementing a particular radio standard) to a client system. The client system may select a desired SDR kernel through a variety of means disclosed herein. While some SDR kernels may be provided for free and unrestricted use, others may be purchased or subscribed to and additionally restricted by digital rights management ("DRM") policies. Based upon the agreed upon payment terms and any other restrictions, a customized set of DRM policies may be applied by the server system to the SDR kernel before sending it to a client system. Additionally, the server system may provide a description of governmental regulations applicable to a given locality.

20 Claims, 6 Drawing Sheets

U.S. PATENT DOCUMENTS

| | | | |
|---|---|---|---|
| 2002/0144134 A1 | 10/2002 | Watanabe et al. | |
| 2002/0165986 A1 | 11/2002 | Tarnoff | |
| 2003/0050055 A1* | 3/2003 | Ting et al. | 455/419 |
| 2003/0120583 A1* | 6/2003 | Olson et al. | 705/37 |
| 2003/0216927 A1 | 11/2003 | Sridhar et al. | |
| 2004/0029575 A1 | 2/2004 | Mehta | |
| 2004/0034853 A1 | 2/2004 | Gibbons et al. | |
| 2004/0063425 A1 | 4/2004 | Wakutsu et al. | |
| 2004/0073901 A1 | 4/2004 | Imamatsu et al. | |
| 2004/0098715 A1* | 5/2004 | Aghera et al. | 717/173 |
| 2004/0242261 A1 | 12/2004 | Fette | |
| 2005/0007988 A1 | 1/2005 | Ferris et al. | |
| 2005/0027789 A1 | 2/2005 | Luo et al. | |
| 2005/0055689 A1 | 3/2005 | Abfalter et al. | |
| 2005/0059427 A1* | 3/2005 | Wallace | 455/552.1 |
| 2005/0108382 A1 | 5/2005 | Murotake et al. | |
| 2005/0190827 A1 | 9/2005 | Xu et al. | |
| 2005/0227692 A1* | 10/2005 | Kawashima et al. | 455/435.2 |
| 2006/0265706 A1* | 11/2006 | Isaacson et al. | 717/174 |
| 2007/0077903 A1 | 4/2007 | Hassan et al. | |

FOREIGN PATENT DOCUMENTS

| | | |
|---|---|---|
| GB | 2350749 | 12/2000 |
| JP | 2003-087858 | 3/2003 |
| JP | 2005-122699 | 5/2005 |
| JP | 2006-109397 | 4/2006 |
| JP | 2006-309533 | 11/2006 |
| WO | WO 02/37222 A2 | 5/2002 |
| WO | WO 03/028228 A2 | 4/2003 |
| WO | WO 03/071813 A2 | 8/2003 |
| WO | WO 2004008719 A2 | 1/2004 |

OTHER PUBLICATIONS

Cognitive Radio Applications in Software Defined Radio, http://www.sdrforum.org/pages/sdr04/1.5%20Cognitive%20Radio%20Neel/1.5-3%20Polson.pdf, published 2004.

"Digital Modular Radio (DMR): Overview," General Dynamics C4 Systems, available at least as of Sep. 29, 2005, 2 pages, http://www.gdc4s.com/content/detail.cfm?item=39e9elf2-9787-4186-bb73-bb3efa73237d.

Falk et al., "Approaches for Secure SDR Software Download," 6 pages, published 2004.

Glossner et al., "Wireless SDR Solutions: The Challenge and Promise of Next Generation Handsets," *Proc. CDC 2002 Communications Design Conference*, San Jose, California, Sep. 2002, pp. 1-6, http://ce.et.tudelft/nl/publicationfiles/595_22_glossner_communications_conference.pdf.

International Search Report for International Application No. PCT/US2006/038338 mailed Feb. 21, 2007.

Office Action in related Chinese Application No. 200680041463.6 dated Mar. 13, 2009.

Research and Developments of Software-Defined Radio Technologies in Japan, published Aug. 2001.

Software Defined Radio Test Bed for Integration Communications and Navigation Applications, published 2004.

Software Defined Radio, http://www.telecom.ntua.gr/mobilevenue02/presentations/RNM_contribution_foka, published 2002.

"WiNRADiO . . . the future of radio™ PC Radios Rule," available at least as of Sep. 29, 2005, 3 pages, http://www.winradio.com/home/facts.htm.

Wireless Communications and Mobile Computing, Wiley InterScience: Journal: (Abstract): vol. 2, Issue 8, pp. 789-798, Published online: Dec. 23, 2002.

Wireless Personal Communications, SpringerLink—Article: (Abstract): vol. 13, Nos. 1-2, May 2000, pp. 145-166.

Mitola, Joseph III, Cognitive Radio: an Intergrated agent architecture for software defined radio, Dissertation, May 8, 2000, Sweden.

Ashcraft, K et. al.,. Using Programmer-Written Compiler Extensions to Catch Security Holes, 2002 Proceedings IEEE.

Balfanz, Dirk, Usable Access Control for the World Wide Web, ACSAC, 2003, IEEE.

Hoflehner, G.F. et al. The compiler as a validation and evaluation tool, 2003, 1-18, Elsevier Science B.V.

Report on Issues and Activity in the Area of Security for Software Defined Radio, Sep. 2002, 1-121, SDR forum.

Mohebbi, Behzad, et al., A case study of mapping a software-defined radio (SDR) Application on a reconfigurable DSP core, 2003, 1-6, ACM.

\* cited by examiner

NETWORK SERVICE FOR MODULARLY CONSTRUCTING A SOFTWARE DEFINED RADIO

BACKGROUND

The terms software defined radio ("SDR") and software radio ("SR") apply broadly to the technique of using software to define and implement portions of a radio system that would previously have been implemented using custom-built hardware. The power of general-purpose processors and software configurable hardware has steadily risen to a level where they can perform many of the computationally intensive digital signal processing ("DSP") functions performed by radio systems and SDR capitalizes on this increase in power. The SDR software component is typically a hardware device (e.g., a field programmable gate array) which has been configured by software, or a program executing on a general-purpose computer. This SDR software component typically interfaces, via data communication channels, to an SDR hardware component providing the functionality necessary to support SDR tasks that cannot be accomplished by the reconfigurable hardware module or general-purpose computer being used (e.g., the analog transmission and reception of radio signals and analog filtering of the received analog signals).

In modern SDR systems, the SDR hardware component typically provides little of the total SDR functionality as most of the DSP work can presently be done using software. SDR allows the functionality defined by software to be redefined without requiring the replacement of hardware components. Instead, only the software that defines these functional modules is replaced. The more functionality that is defined by software, the more flexible and reconfigurable the resulting SDR becomes. The combination of the SDR hardware component and SDR software component can be used to support a variety of radio standards by running a different SDR software component for each implementing standard.

As a result of the complexity and various nuances of the great many radio standards that exist, the SDR software components implementing these radio standards may be provided by an equally large variety of third party providers. Despite their relative simplicity, a great number and variety of SDR hardware components with varying capabilities are also available. Each SDR software component must be equipped to interface with an SDR hardware component as well as with client applications which make use of the SDR to send or receive data. Supporting each of the methods for a client application to connect to the SDR software component, and the many available SDR hardware components quickly becomes a daunting task for those providing the SDR software components, distracting them from their core area of concern and competency. Furthermore, a majority of the effort necessary to provide such support is repeated by each of the providers of SDR software components. These factors currently limit the universality and practicality of SDR systems.

SUMMARY

The Inventors have identified a need for modularly constructing an SDR and herein disclose an invention for doing so. One aspect of the present invention of modularly constructing an SDR provides an abstraction of the definition of the software defined signal processing components of the SDR (herein referred to as the SDR kernel) from all other components of the SDR, such as the platform-specific and protocol-dependent input/output interface components (e.g., a component for interfacing to USB on an x86 general-purpose computer running the Microsoft® Windows® operating system) as well as from particular SDR hardware components. The aforementioned aspect of modularly constructing an SDR implicitly provides support for the establishment of a simple interface definition between an SDR kernel and the rest of the SDR. Thus, developers of SDR kernels can focus attention away from supporting the plethora of protocol/hardware platform/operating system/SDR hardware component combinations toward developing SDR kernels for the many radio standards that exist and the many more that are likely to emerge.

Modularly constructing an SDR empowers a system to utilize the SDR kernels provided by a variety of publishers to effectively become a universal communication device. The process of supporting a radio standard is thus reduced to one of obtaining an SDR kernel describing an SDR kernel component for implementing the radio standard, and constructing an SDR software component for executing the SDR kernel component on a particular system. As disclosed herein, SDR kernels may be obtained in a variety of ways and, in one aspect of the invention, an SDR kernel is attained by download from an internet-based service.

In another aspect of modularly constructing an SDR, regulation data comprising government regulations for one or more localities is used to prevent the construction of an SDR which would violate the regulations described by the regulation data. In another aspect of the invention, the SDR software component is constructed with a regulation component for ensuring that, while the SDR is executing, no control data is sent from the SDR software component to the SDR hardware component which could lead to the SDR violating regulations described by the regulation data. The aspects of the present invention utilizing the regulation data help ensure that a modularly constructed SDR behaves as a "good citizen."

BRIEF DESCRIPTION OF THE DRAWINGS

It is noted that components that appear in multiple figures and function identically are given the same labels in each of the figures.

DETAILED DESCRIPTION

Before discussing the present invention, we first explore an embodiment of a typical SDR system as known in the prior art.

Figure 1:
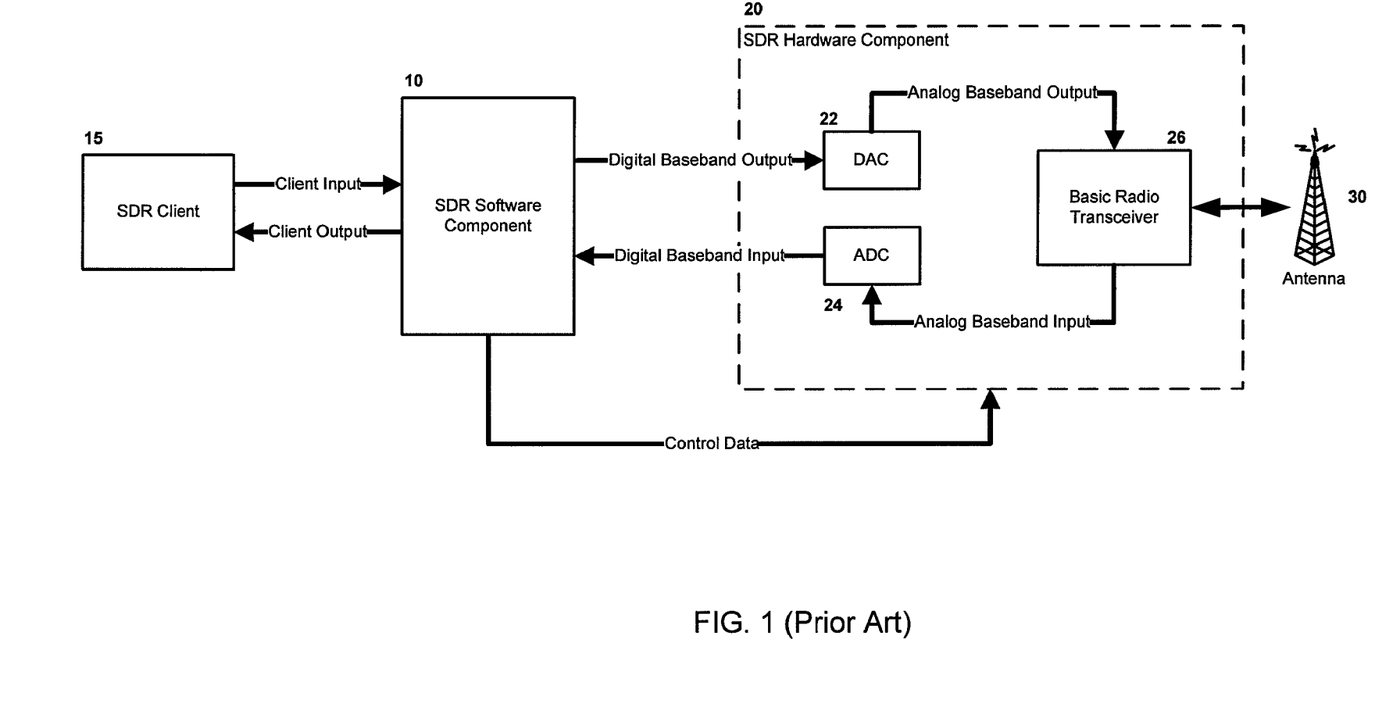
FIG. 1 is a block diagram of an SDR system as known in the prior art.

FIG. 1 is a block diagram showing a typical SDR system as known in the prior art. An SDR software component 10, running on a host (e.g., general-purpose computer or software-configured hardware), is connected to an SDR hardware component 20 by one or more data channels permitting the transmission of: digital baseband output data from the SDR software component 10 to the SDR hardware component 20, digital baseband input data from the SDR hardware component 20 to the SDR software component 10, and control data from the SDR software component 10 to the SDR hardware component 20. The SDR software component 10 receives client input data from an SDR client 15 and sends client output data to the SDR client 15.

The digital baseband output typically results from the SDR software component 10 performing a series of DSP functions necessary to prepare the client input data from the SDR client 15 for transmission by the SDR hardware component 20. These functions may include: source encoding, encryption, error-correction coding, and baseband modulation. This digital baseband output must be converted to analog form before being transmitted. This is accomplished through the use of a digital-to-analog converter ("DAC") 22. Once converted, the analog baseband output is sent to the basic radio transceiver 26 for further processing, which may include upconverting the baseband signal to the appropriate transmission frequency and amplification. After being appropriately processed, the signal is sent to an antenna 30 for transmission.

Signals received by the antenna 30 are processed by the basic radio transceiver 26, where they may be filtered to obtain a desired frequency range, downconverted to the appropriate baseband frequency modulation, and sent to an analog-to-digital converter ("ADC") 24 to be converted from analog baseband data to digital baseband data. This digital baseband data is then sent to the SDR software component 10 where a series of DSP functions are performed which may include: baseband demodulation, error correction, decryption, and source decoding. The resulting data stream may then be sent as client output data to the SDR client 15.

The control data sent from the SDR software component 10 to the SDR hardware component 20 permits the SDR software component 10 to send commands to the SDR hardware component 20. These commands may be used to adjust important parameters such as the center frequency and bandwidth of interest and may define a frequency range to which the basic radio transceiver 20 can tune. Additional commands may influence, for example, how the incoming signal is filtered as well as invoke basic actions such as powering down the SDR hardware component 20.

The digital baseband input, digital baseband output, control data, client input, and client output usually are transmitted across a data channel which makes use of specialized hardware and transmission protocols (e.g., USB, PCI, an SCSI). Thus, the SDR software component 10 must implicitly have the ability to interface with these channels and any software components supporting them.

Figure 2:
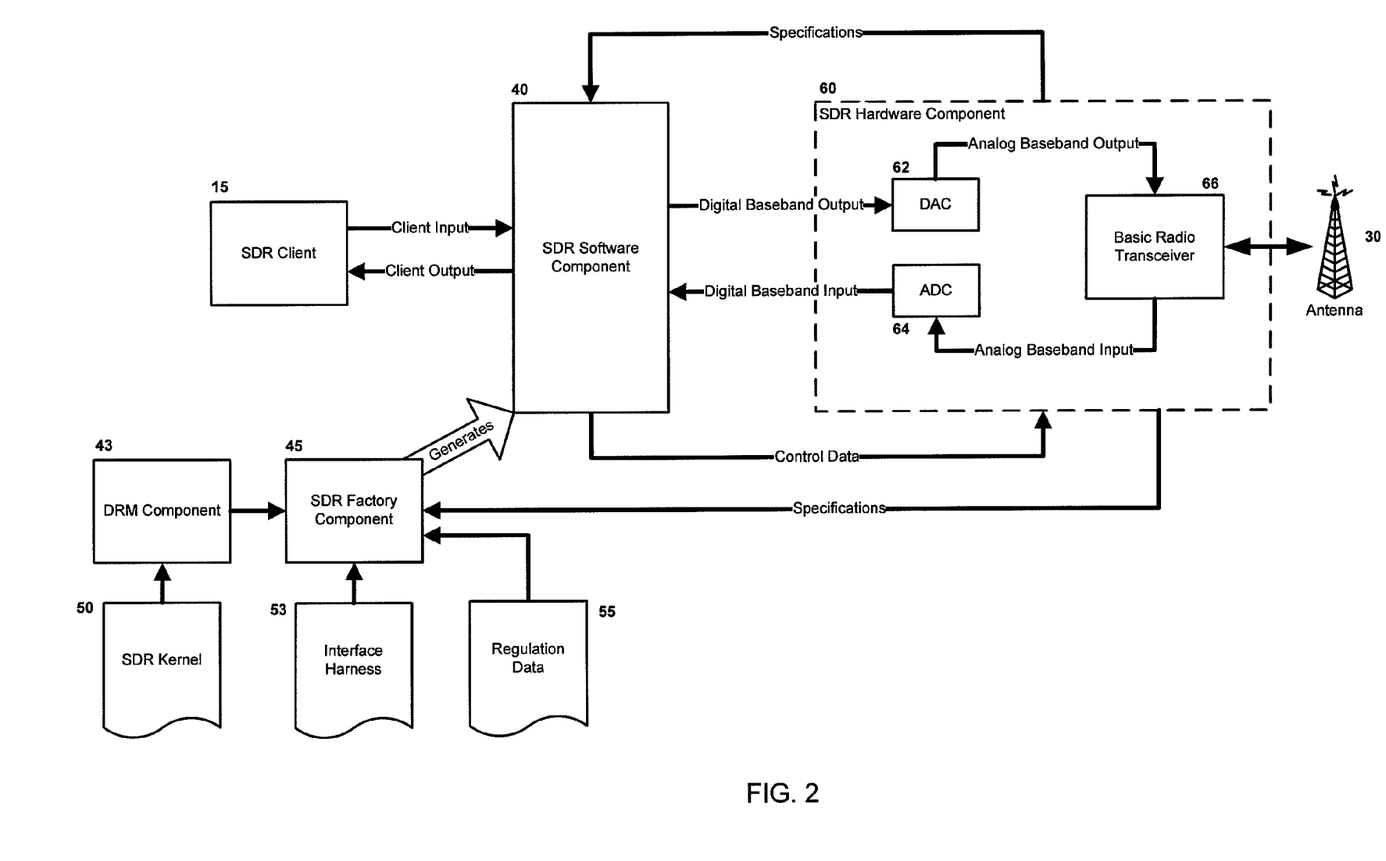
FIG. 2 is a block diagram illustrating an example of a system according to some aspects of the present invention.

FIG. 2 is a block diagram illustrating an example of a system according to some aspects of the present invention. This system supports the modular construction of an SDR software component given various data. The SDR hardware component 60 is configured in the same manner as the SDR hardware component 20 which was disclosed earlier, with the exception of having the additional ability to send specifications detailing its capabilities. The sending of these specifications may occur in a variety of ways such as: when the SDR hardware component 60 is powered-up, periodically, or as a result of control data for requesting the specifications to be sent. An SDR factory component 45 reads an SDR kernel 50, an interface harness 53, and optionally inputs regulation data 55 and may be, for example, be implemented as hardware or as a program running on a general-purpose computer. The DRM component 43, when present, provides enforcement of DRM policies which may be present in the SDR kernel 50 and may decrypt some or all of the contents of the SDR kernel 50 before sending it to the SDR factory component 45 to be read.

The SDR kernel 50 comprises the definition of the configuration and arrangement of components such as signal processing elements and control elements. The SDR kernel also provides a simple interface definition which may, for example, specify connections for SDR client input, SDR client output, SDR hardware component input, SDR hardware component output, and control data output. The simple interface need not provide a definition of components for communicating over particular data channels (e.g., USB, PCI, SCSI, Serial, Parallel, and Ethernet) which appear in a typical host. The SDR kernel 50 may be provided as software (e.g., object code, source code) or non-software (e.g., XML, unstructured text data, binary data) and may further comprise tamper-resistant data such as: a digitally signed checksum of the data in the SDR kernel 50 (for ensuring the contents have not been corrupted or altered), a digital signature from the publisher, and digitally signed testing certification with a checksum of the data in the SDR kernel (for ensuring the contents have been deemed safe by a trusted party). While digital signatures are given as an example of a tamper-resistant technology for securing this data, it us understood that any technology providing a similar function is also applicable to this aspect of the invention. As previously disclosed, the SDR kernel 50 may be protected by DRM for enforcing usage policies set by its publisher. If the SDR kernel 50 does not comprise object code, it can be converted by the SDR factory component 45 to an SDR kernel component comprising a series of instructions suitable for configuring a host to implement the defined radio standard.

The interface harness 53 comprises all necessary software components for interfacing an SDR kernel component (i.e., the platform-specific instructions implementing a radio standard constructed from an SDR kernel 50) to an SDR client 15 and an SDR hardware component 60. By using a separate interface harness 53, the SDR kernel 50 need only implement a single (possibly host-independent) interface.

The regulation data 55 comprises regulatory information such as the licensed and unlicensed frequency bands and transmission power limits for certain frequency bands for one or more localities. The regulation data 55, when present, may be used by the SDR factory component 40 in at least two ways, the ways being usable together or separately.

One way of using the regulation data 55 is to prevent the construction of an SDR software component which would violate the regulations described within the regulation data 55 and is only applicable when the operating specifications (e.g., bandwidth, frequencies used, signal power) of the SDR kernel 50 can be determined Determining these specifications can be done easily when they are explicitly provided within the SDR kernel 50. If the specifications are not explicitly provided, it may be possible to determine these specifications by analyzing the description in the SDR kernel 50. Once the specifications are determined, a comparison with the regulation data 55 can be performed to determine if any violations might occur. If so, an error can be raised and the construction of the SDR software component 40 halted.

Another way to use the regulation data 55 is to construct a regulation component as part of the constructed SDR software component 40. This regulation component censures the control data sent to the SDR hardware component 60 to ensure that the resulting settings in the SDR hardware component 60 will not violate any regulations. It is also possible to raise a warning when the control data instructs the SDR hardware component 60 to configure itself in a way such that it would violate any regulations without stopping the control data from being sent.

The SDR kernel 50, interface harness 53, and regulation data 55 may each be stored on any computer-readable medium (e.g., CD, DVD, hard disk, flash storage, RAM), and may also be transmitted across any data communication network (e.g., internet, LAN) using any appropriate protocol (e.g., HTTP, TCP/IP, FTP, SOAP). The SDR kernel 50 and the regulation data 55 may also be combined to form a single file or stored separately.

The SDR factory component 45 uses the definition provided by the SDR kernel 50 along with any provided regulation data 55 to construct and optionally execute an SDR software component 40. If the SDR kernel 50 is protected by DRM policies, the SDR factory component 45 may itself enforce the DRM policies or read the SDR kernel 50 through a DRM component 43 which enforces the policies. The DRM policies may be enforced at the time the SDR factory component 45 is being constructed and the SDR software component 40 and may additionally construct a sub-component of the SDR software component 40 to enforce DRM policies during the execution of the SDR software component 40. In most cases, an SDR kernel 50 that is protected by DRM policies will have contents that are unreadable by the SDR factory component 45. Making the contents of the SDR kernel 50 unreadable may be accomplished, for example, by using encryption to scramble the contents. The encrypted portions of the SDR kernel 50 must therefore be unencrypted before the SDR software component 40 construction process can continue. This decryption can be performed either by the DRM system 43 through which the SDR factory component 45 may read the SDR kernel 50, or by the SDR factory component 45 itself.

Though it has been indicated that the SDR factory component 45 constructs a separate SDR software component 40, we recognized that the SDR factory component 45 could alternatively transform at least part of itself into the SDR software component rather than constructing a separate SDR software component 40.

Once the SDR software component 40 is executing on the host, the SDR client 15 and the SDR hardware component 60 may begin communicating with it. We note that the SDR client 15 may comprise one or more hardware and software components and may communicate with the SDR software component 40 via any communications means including but not limited to: conductive wires, optical fibers, network interface cards, serial ports, PS2 ports, parallel ports, USB ports, the PCI bus, and SCSI channels. The digital baseband output, digital baseband input, and control data may be transmitted using any interface method suitable for interfacing with the host executing the SDR software component 40 and need not all use the same method. When the host is a general-purpose computer, for example, these methods may include: USB, PCI, FIREWIRE, serial port, parallel port, network interface card, and SCSI. We note that only one of the digital baseband input and digital baseband output are necessary to support a system which is useful for some applications. We further note that when using high performance ADC 24 and DAC 22 components in the SDR hardware component 60, the baseband input and baseband output may communicate data that has a modulation which has not been downconverted.

The specifications data transferred from the SDR hardware component 60 to the SDR software component 40 may comprise the operational limitations of the SDR hardware component 60 (e.g., maximum allowable bandwidth and frequency). This information allows the SDR software component 40 to determine if the SDR hardware component 60 can support the standard it embodies. The SDR hardware component 60 can also optionally be configured to return an error code to the SDR software component 40 rather than providing specifications data. An example of why an SDR hardware component 60 would be unable to support an SDR software component 40 is that one or more of the frequencies it uses may lie outside the range of the basic radio transceiver 66. Another example is that the bandwidth needed may be too wide for the abilities of the ADC 64 or DAC 62. If the SDR hardware component 60 cannot support the SDR software component 40, the SDR software component 40 can generate a meaningful error message and terminate.

When an SDR software component 40 is executing, it can communicate control data to the SDR hardware component 60. This control data may comprise commands to: power down the SDR hardware component 60, specify the frequencies of interest and their corresponding bandwidths, and set filter settings. These control commands allow the SDR software component 40 to dynamically change the operating parameters of the SDR hardware component 60 and are important for supporting multiple radio standards. The exact set of control data that can be sent may depend upon the particular SDR hardware component 60 being used.

The SDR kernel 50 also may comprise data specifying the minimum required specifications required of an SDR hardware component 60 capable of supporting the radio standard described by the SDR kernel 50. The SDR factory component 45 can access the specifications of the SDR hardware component 60 either directly from the SDR hardware component 60, operatively by reading the specifications from a computer-readable medium on which they have been stored, or by any other means. The SDR factory component 45 reviews the specifications of the SDR hardware component 60 to determine, before constructing the SDR software component 40, if the SDR hardware component 60 can support the standard described by the SDR kernel 50. If the SDR hardware component 60 is determined to be unable to support the standard, the SDR factory component 45 terminates the construction of the SDR software component 40 and optionally indicates an error. If the SDR factory component 45 cannot determine the minimum required specifications from the SDR kernel 50, the SDR factory component 45 may construct a specifications enforcement component which reads the specifications data from the SDR hardware component 60 and censures outgoing control data to prevent commands from being sent to the SDR hardware component 60 which the SDR hardware component 60 could not support and may prevent equipment damage in some instances.

Figure 3:
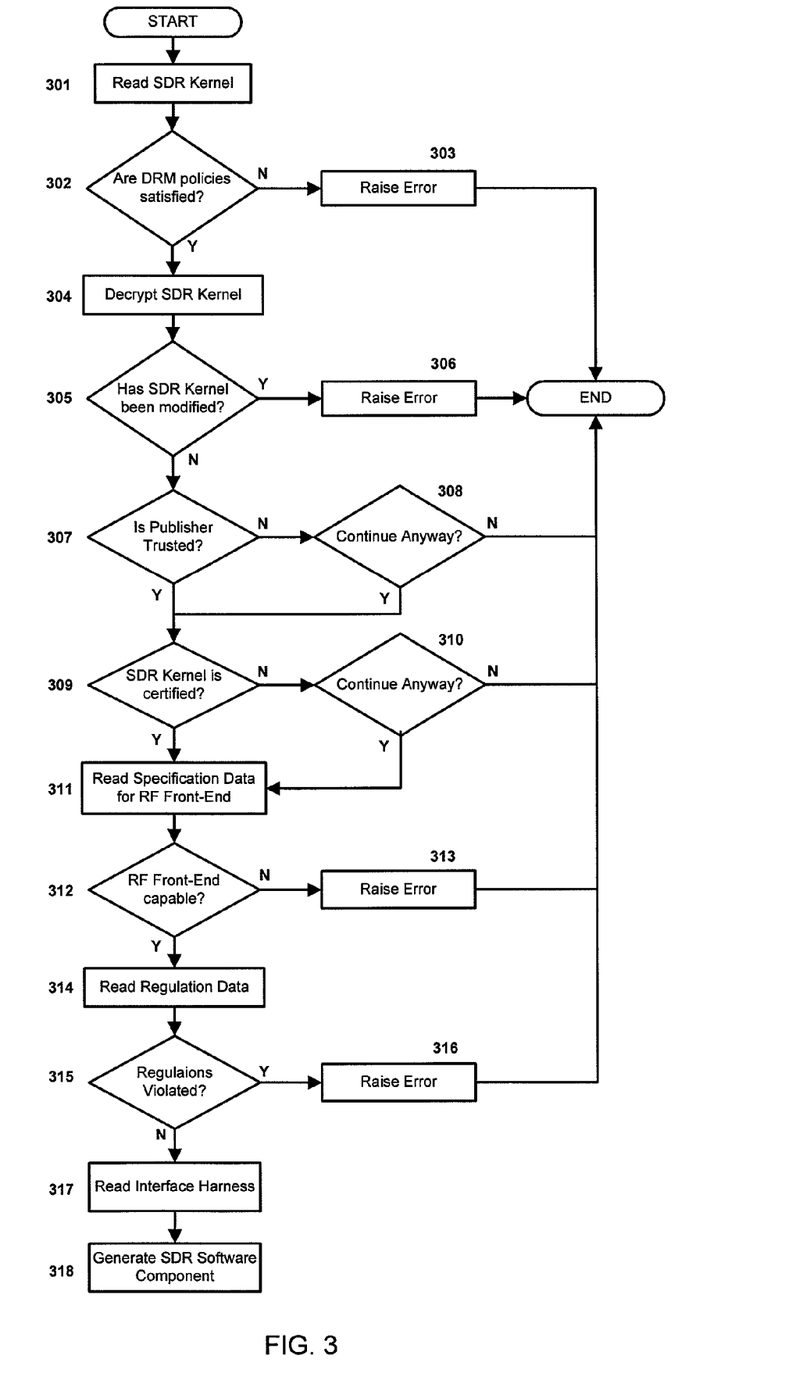
FIG. 3 is a flow diagram for an example of a process for constructing an SDR software component.

FIG. 3 is a flow diagram of an example of a process for constructing an SDR software component. In 301, either the DRM component 43 or the SDR factory component 45 reads the contents of the SDR kernel 50. As previously disclosed, the SDR kernel 50 may be read from any computer-readable medium including any data communication network.

In 302, either the DRM component 43 or the SDR factory component 45 reads any DRM policies that are embedded within the SDR kernel 50 and checks to see if the conditions of the policies are currently satisfied. These policies may include ensuring the SDR kernel 50 is being read on a particular host and ensuring the current date-time is within a specific date-time range. If it is determined in 302 that one or more DRM policies are not satisfied, an error is raised in 303 and the construction of the SDR software component is terminated. On the other hand, if it is determined that the DRM policies are satisfied, the SDR kernel 50 is decrypted in 304, if necessary. This allows the remaining contents of the SDR kernel 50 to be read and used in further along in the SDR software component 40 construction process.

In 305, the SDR factory component 45 makes use of data stored within the SDR kernel 50 to determine if any changes have been made to the SDR kernel 50 since the contents were last verified by a publisher or trusted third party. This act may, for example, be accomplished by reading data such as a digitally signed checksum from the contents of the SDR kernel 50, verifying the authenticity of the signature, and then performing a checksum calculation on the SDR kernel 50 to ensure that the two checksums match. A reason for performing this act is to ensure that the contents of the SDR kernel 50 have not been corrupted by errors in storage or transmission and to further ensure that a third party does not modify the SDR kernel 50 to perform in a manner the publisher did not intend. If it is determined that the contents of the SDR kernel 50 have been modified from their intended state, an error is raised in 306. After raising the error, the SDR factory component 45 terminates and does not construct an SDR software component from the SDR kernel 50.

If it is determined in 305 that the SDR kernel 50 has not been corrupted or modified, the SDR factory component 45 makes use of information provided within the SDR kernel 50 to identify the publisher of the SDR kernel 50. It can next be determined if the publisher is a trusted publisher by, for example, checking the identity of the publisher against a list of trusted publishers. Alternatively, a chain of trust may be determined to exist whereby the publisher is determined to be trustworthy in a less direct manner. When a publisher cannot be verified as trustworthy, it is not necessarily the case that the SDR kernel 50 should not be used. In 308, after the SDR factory component 45 fails to find the publisher trustworthy, the SDR factory component 45 raises a warning. This warning may comprise identification information for the publisher (e.g., company name) and present a choice to either: 1) continue using the SDR kernel 50 even though the publisher is not deemed trustworthy, or 2) abandon its use.

If it is determined in 307 that the publisher of the SDR kernel 50 is trustworthy, or if in 308 the decision is made to continue using the SDR kernel 50 even if the publisher is not determined to be trustworthy, the SDR factory component 45 next performs 309. In 309, the SDR factory component 45 uses information from the SDR kernel 50 to check for any testing certifications that may be present. These certifications may, for example, comprise a checksum of the data in the SDR kernel 50 and be signed by a certificate known to signify that the SDR kernel 50 has passed a series of tests to ensure quality. If an SDR kernel 50 lacks a desired certification, the SDR factory component 45 raises a warning in 310. The warning may comprise information about the desired certification that is missing and present a choice to either: 1) continue using the SDR kernel 50 even though the desired certification is missing, or 2) abandon its use.

If it is determined in 309 that the SDR kernel 50 has all desired certifications, or if the decision is made in 310 to continue using the SDR kernel 50 even if the desired certifications are not present, the SDR factory component 45 next performs 311. In 311, the SDR factory component 45 reads the specification data detailing the capabilities of the SDR hardware component 60. This may be accomplished, for example, by requesting the data directly from the SDR hardware component 60, reading a file containing the information, or prompting for the information. The specification information for the SDR hardware component 60 may comprise data outlining the ranges supported for each parameter relevant to the configurable operation of the SDR hardware component 60.

Once obtained, the specification data can be used in 312 to determine if the SDR hardware component 60 is capable of supporting the requirements of the SDR kernel 50. If data is included in the SDR kernel 50 indicating its operational ranges, a comparison can be made between this data and the specification data to determine if any of the ranges for the SDR kernel 50 data lie beyond those of the capabilities of the SDR hardware component 60. If it is determined in 312 that the requirements of the SDR kernel 50 are beyond than the abilities of the SDR hardware component 60 as given in the specification data, an error is raised in 313 and the SDR factory component 45 terminates construction of the SDR component. This act is useful because it prevents the construction of an SDR software component 40 that would attempt to drive an SDR hardware component 60 beyond its abilities. This helps reduce the possibility of equipment damage and lessens the time spent debugging an SDR that is not working properly as a result of an SDR hardware component 60 that cannot support a given SDR kernel 50.

If it is determined that the SDR hardware component 60 is capable of supporting the SDR kernel 50, then the SDR factory component 45 moves on to 314. In 314, the SDR factory component 45 reads the regulation data 55. As previously disclosed, the regulation data 55 comprises data relevant to the government regulations in one or more localities. These regulations may comprise data relevant to the allocation of licensed and unlicensed frequencies and the usage of those frequencies as well as the maximum allowable broadcast power for certain frequency ranges. Once the SDR factory component 45 has read the regulation data in 314, the SDR factory component 45 in 315, determines if the operational parameters in the SDR kernel 50 would violate any of the regulations provided by the regulations data 55. The SDR factory component 45 may first determine the location where the SDR will be operating by prompting for the information or through an automatic process such as drawing inferences using GPS information. If it is determined in 315 that the SDR kernel specifies an operational range which may violate pertinent regulations outlined by the regulation data 55, an error is raised in 316 and the process of constructing the SDR component is halted.

If it is determined that the SDR kernel 50 would not violate the regulations data 55, then the SDR factory component 45, in 317, reads an interface harness 53 which, as previously disclosed, comprises components for operatively connecting the simple interface described by the SDR kernel 50 to more complicated interfaces for communicating with an SDR client 15 or an SDR hardware component 60. For example, if the SDR hardware component 60 is connected to a general-purpose computer by a USB connection, the interface harness 53 would comprise one or more components for sending data over the USB connection to the particular SDR hardware component 60 being used. The SDR kernel 50 would provide a basic interface for sending data, but would have no description for sending data over USB or any specific commands for supporting a particular SDR hardware component 60. When necessary, the interface components also translate control data and specifications data bi-directionally between the format used by the SDR kernel 50 and the SDR hardware component 60.

Figure 4:
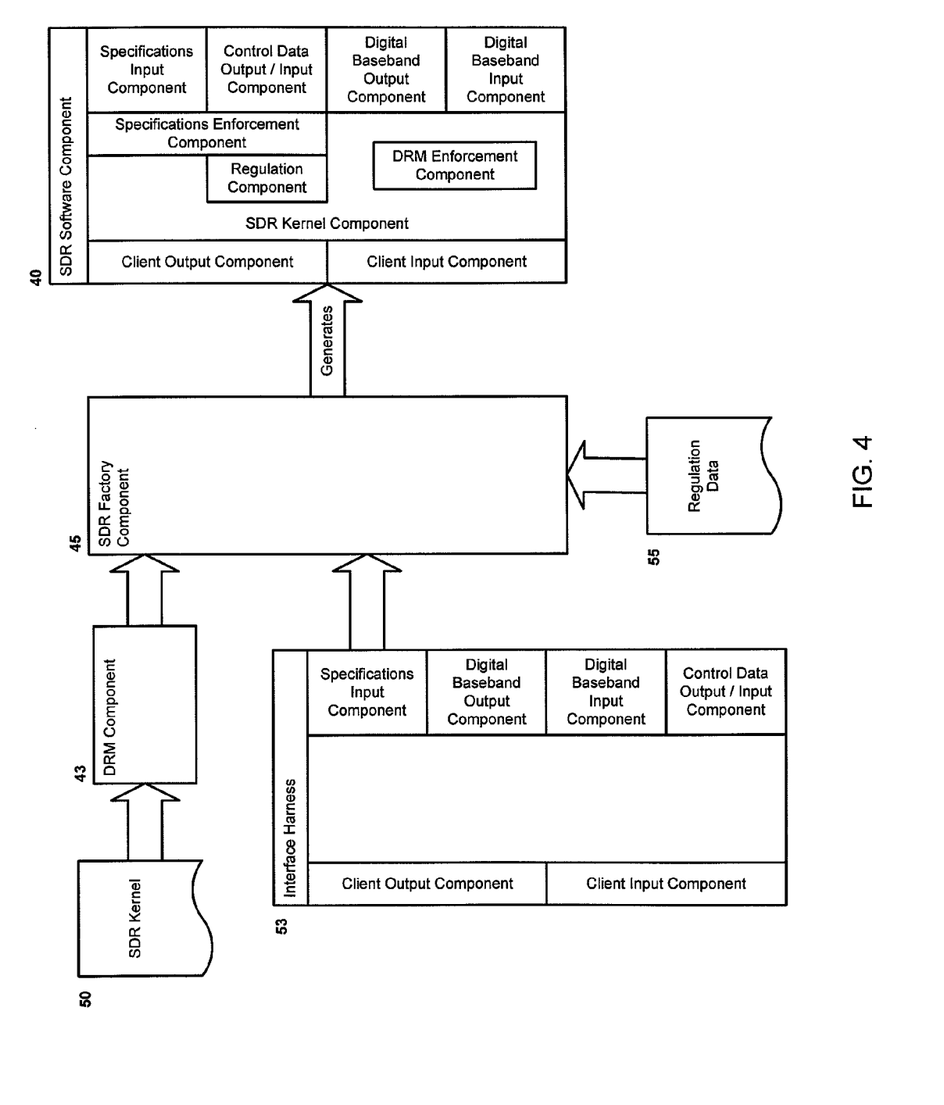
FIG. 4 is a block diagram showing more detail pertaining to the construction of an SDR software component.

In 318, the SDR factory component 45 constructs the SDR software component 40. FIG. 4 shows a block diagram with more detail pertaining to the construction of an SDR software component 40 by an SDR factory component 45. The SDR kernel 50 is converted to an SDR kernel component, which is a software description of the SDR kernel that is appropriate for instructing a processor such as a general-purpose processor or field programmable gate array ("FPGA") on how to execute (e.g., object code). If the SDR kernel 50 is provided in object code format suitable for instructing the desired target host, then it may not be necessary to perform any explicit conversion. If the SDR kernel 50 is provided as the source code of a programming language, then compilation and linking may be used in parts of the conversion process. When provided in a data format (e.g., XML), the SDR kernel 50 can, for example, be parsed and converted by a code generation component in the SDR factory component 45.

If regulation data 55 is provided, the data is parsed and object code is generated for ensuring that control data sent from the SDR kernel component to the SDR hardware component 60 will not violate regulations. The regulation component comprises this generated object code. The same process applies to the specifications data containing the capabilities of the SDR hardware component 60. This specifications data is used to generate the object code of which the specifications enforcement component comprises. Once each individual component has been generated, they are appropriately linked together in order to function together as a system and form the SDR software component 40. The linking methods used may comprise static linking and dynamic linking and the object code defining the SDR software component may physically reside in multiple files or a single file.

We have disclosed aspects of the present invention directed to constructing an SDR software component using various data such as the regulation data, SDR kernel, interface harness, and specifications from the SDR hardware component. We now turn our attention to aspects of the present invention directed to obtaining the regulation data and SDR kernel.

Figure 5:
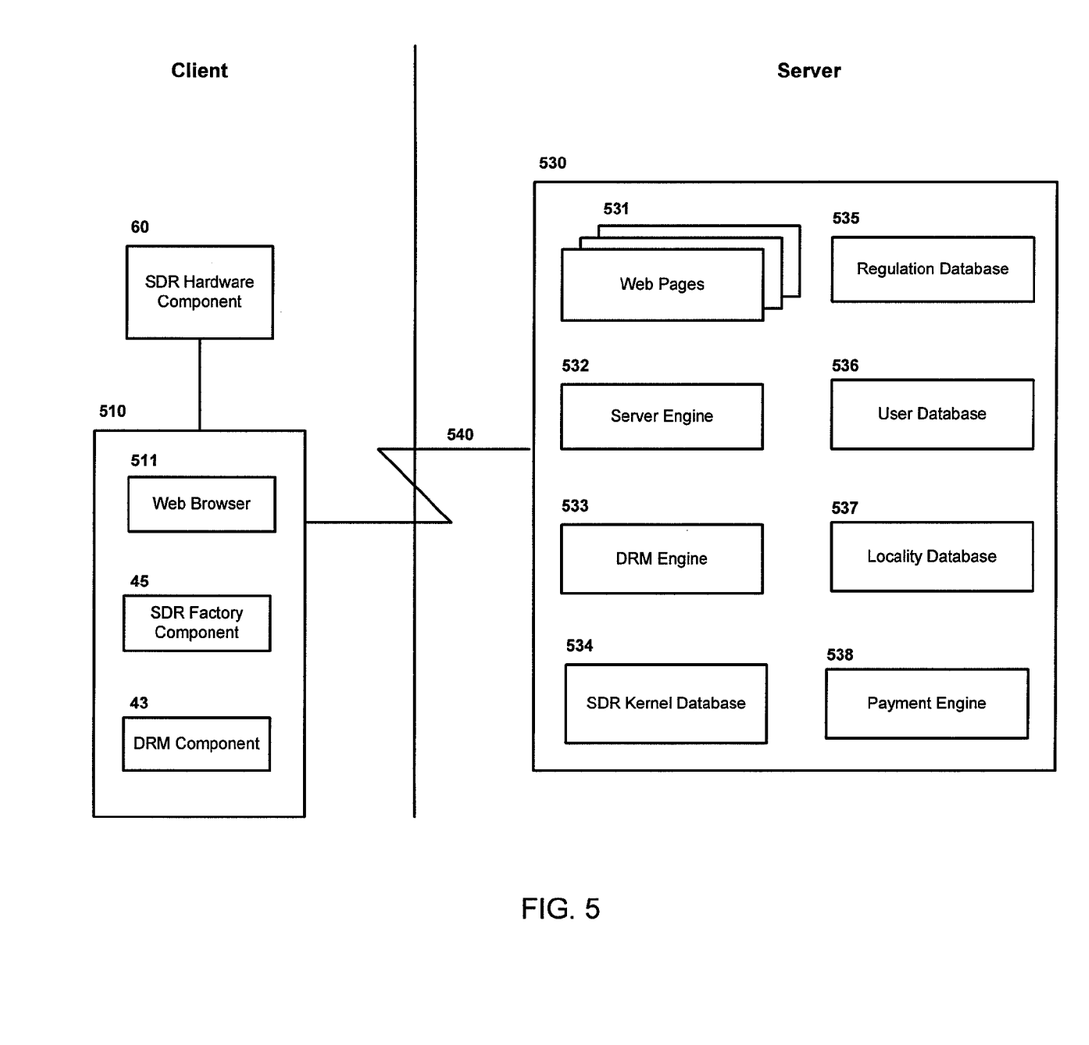
FIG. 5 is a block diagram illustrating an example of a system according to some aspects of the present invention.

FIG. 5 is a block diagram illustrating an example of a system according to some aspects of the present invention. This system supports the modular construction of an SDR by providing a service through which the previously disclosed regulation data and SDR kernel may be obtained over the Internet using the World Wide Web. The server system 530 comprises various web pages 531, a server engine 532, a DRM engine 533, an SDR kernel database 534, a regulation database 535, a user database 536, a locality database 537, and a payment engine 538.

The server engine 532 receives HTTP requests to access web pages or web service listeners identified by URLs and provides Web pages or SOAP responses to the various client systems. Additionally, the server engine 532 may receive requests for files to be transmitted over HTTP. If the server engine approves the request, it sends the file to the client system. The DRM engine 533 applies DRM policy to an SDR kernel and may encrypt some or all of the contents of the SDR kernel before it is sent to a client system. The DRM policies may include: copy protection, setting time limitations on use of the SDR kernel, and binding the SDR kernel to a particular host.

The SDR kernel database 534 contains SDR kernels, each providing a description of a component for implementing a radio standard, as previously disclosed. The SDR kernel database 534 additionally contains pricing information for each SDR kernel, a unique identifier for each SDR kernel, and an identifier for the radio standard that the SDR kernel describes. The regulation database 535 contains a description of regulations applicable to each locality for which regulation data is available. The user database 536 contains a listing of registered users. For each registered user, the user database 536 additionally may contain: authentication information (e.g., username and password), subscription information, and default locality preferences.

The locality database 537 contains a list of localities, as well as identifiers for the radio standards that may be used in the locality. Additionally, the locality database 537 may have identifiers for allowing the definition of named geographical groupings of localities into a tree-like hierarchy of any depth. For example, their may be a grouping for Earth, a sub-grouping for the Northern Hemisphere, another sub-grouping for North America, another sub-grouping for the United States, another sub-grouping for Massachusetts, and finally the locality of Boston. This example is meant only to be illustrative and not serve to define the granularity of localities or define the scope of the named geographical groupings. The payment engine 538 provides the ability to take account information provided by users of the client system 510 and process payment transactions. These transactions may include receiving funds from a credit card account, debit card, or any other suitable account.

The client system 510 comprises a web browser 511 for requesting and displaying web pages and may optionally comprise an SDR factory component 45 and a DRM component 43. The client system 510 may also be connected to an SDR hardware component 60 as previously disclosed. The client system 510 and the server system 530 communicate by exchanging information via a communications link 540 which may include transmission over the internet.

One of ordinary skill in the art will appreciate that the techniques presented above can be used in various environments other than the World Wide Web. For example, rather than using a web browser 511 to communicate with the server system 530, another application (including the SDR factory component itself) could be used employing another protocol for exchanging information. Files may be transmitted using a variety of protocols such as over email and file transfer protocol ("FTP"). Various communications links may also be used which do not use the internet such as local area networks and point-to-point dialup. Both the client and the server systems may comprise any combination of hardware and software for providing the aforementioned functionality.

Figure 6:
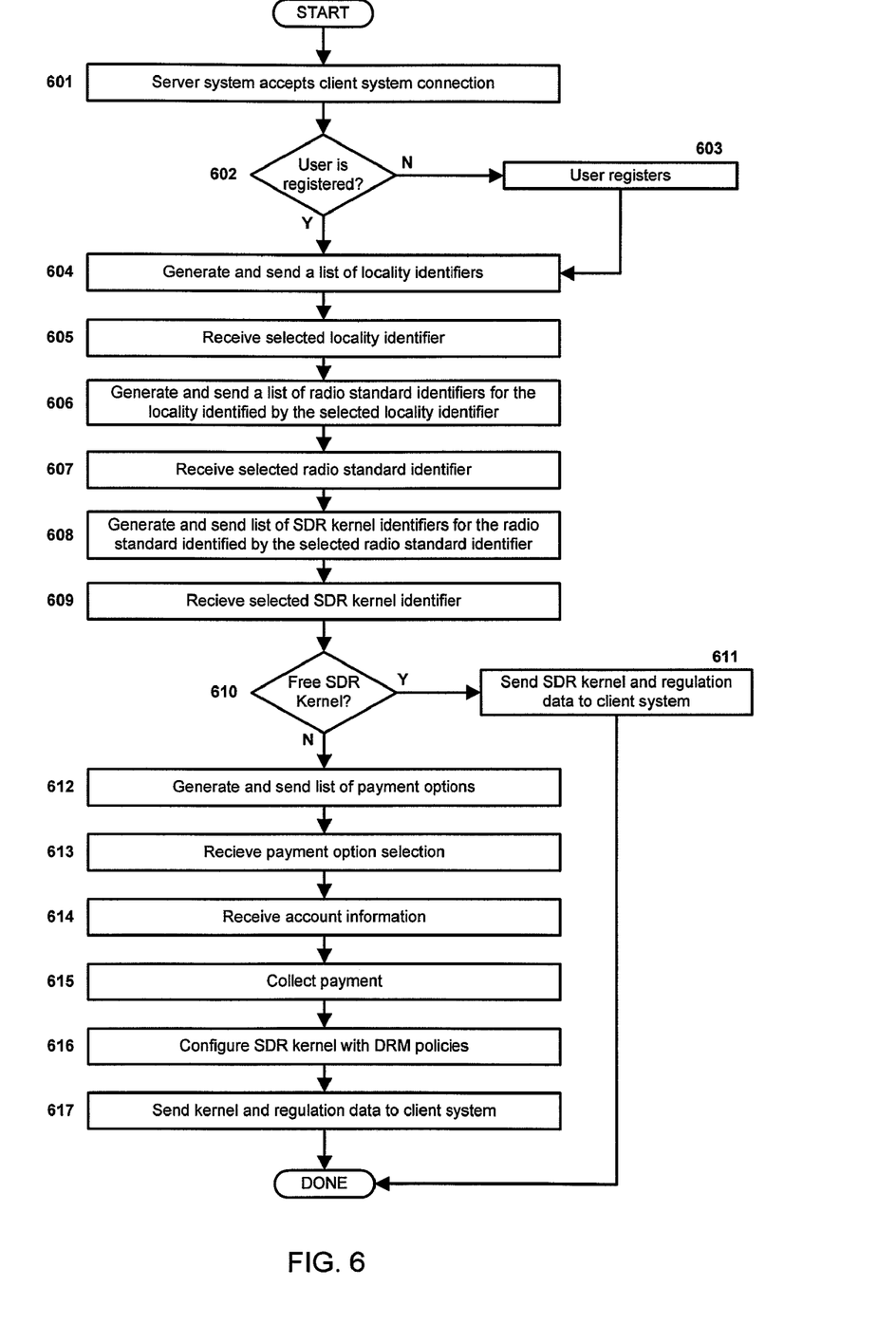
FIG. 6 is a flow diagram of an example routine for sending an SDR kernel to a client system.

FIG. 6 is a flow diagram of an example routine for sending an SDR kernel to a client system. In 601, the server system 530 receives a request from a client system 510 to connect to the server system 530 and accepts the request. In one embodiment, the client system 510 also sends authentication information indicating that the user of the system is registered with the service provided by the server system 530. We note that a user need not be a human operator, but may also be a software program or hardware device configured to communicate with the server system 530. In 602, the information is then checked against the user database 536 to determine if the authentication information provided matches a known user. If the information does not match, the user is directed to register in 603. We note that in further acts of this process, the server system 530 maintains an operatively stateful connection to the web browser 511 on the client system 510 (i.e., does not confuse requests from one web browser 511 with those from another). When using HTTP (a stateless protocol), this may be accomplished through the use of browser cookies or data appended to the URLs of requests sent by the web browser 511.

In 604, the server system 530 generates a list of locality identifiers identifying localities contained in the locality database 537. Herein, an identifier may be any data suitable for identifying a particular item (e.g., strings or numbers). It is understood that multiple identifiers can be used for a given item including one that is easy for humans to read and one that works well with World Wide Web standards (e.g., URL encoding). It is also understood that a list of geographical groupings may be generated and sent to the client system 510 rather than the localities themselves. Once the user has selected a particular geographical grouping, the server system 530 may then return the next level lower in the grouping tree until a set of leaves (i.e., localities) are reached. The user of the client system 510 then selects one of the locality identifiers and returns it to the server system 530 where it is received in 605. The locality identifier received by the user in 605 is kept in the user database 536 for later use.

Once a locality identifier is received, the server system can, in 606, query the locality database 537 for a list of radio standard identifiers identifying radio standards that are used in the identified locality. This list can then be collected and sent to the client system 510. The user of the client system 510 then selects a desired radio standard identifier and returns the selection to the server system 530, where it is received in 607. In 608, the server system generates a list of SDR kernel identifiers for SDR kernels which describe and SDR kernel component for implementing the specified radio standard and sends the list to the client system 510. The server system 530 may additionally send publisher and pricing information for each of the SDR kernels along with the SDR kernel identifier.

The publisher information may comprise data such as: the name of the publisher, date of publication, version, and ratings.

Once the user has selected an SDR kernel identifier from the list, the server system 530 receives the selection in 609. If it is determined from the pricing information in the SDR kernel database 534 that the selected SDR kernel is free (i.e., of no monetary cost), the server system 530 sends the requested SDR kernel to the client system 510. Optionally, the regulation data for the identified locality received from the user in 605 may be sent along with the SDR kernel. This regulation data can be obtained by using the locality identifier stored in the user database 536 to query the regulation database 535 for pertinent regulation data. As previously disclosed, the SDR kernel and regulation data may be combined into a single file or kept separate. The server system 530 may use either approach when sending the SDR kernel and regulation data to the client system 510.

If it is determined in 610 that the selected SDR kernel is not free, then the server system 530 generates, from the payment information stored in the SDR kernel database 534, a list of payment options available for the selected SDR kernel. Alternatively, the list of payment options may be the same for all SDR kernels which are not free. A variety of payment options are conceivable. One example of a payment option is the unlimited duration of usage of an SDR kernel for a fixed price. Another example is the payment of a fixed price for a finite duration of usage. It is also conceivable that the user might pay a fixed monthly subscription fee for unlimited access to some or all of the SDR kernels. Once the user selects the desired payment option, the server system 530 receives the selection in 613. The server system may also optionally receive account information from the user in 614 indicating the account information for the account which should be charged for the transaction. Alternatively, this information can be provided when the user registers in 603 and stored in the user database 636. In this case, the account information received in 614 would be an indication that the data stored in the user database should be used.

In 615, the server system collects payment for use of the selected SDR kernel under the specified payment option using the payment engine 538. In 616, after receiving notification that the financial transaction was successful, the server system 530 retrieves the specified SDR kernel from the SDR kernel database 534 and passes it, along with the details of the selected payment option, to the DRM engine 533. The DRM engine 533 secures the contents of the SDR kernel using, for example, encryption technology and appends tamper-resistant DRM policies to the encrypted SDR kernel which reflect the terms of the service provided by the server system 530 and the specific terms outlined by the selected payment option. Once the DRM engine 533 has finished applying DRM to the SDR kernel, the server system 530 returns the SDR kernel to the client system 510. Optionally, the regulation data for the locality received from the user in 605 may be sent along with the SDR kernel. This regulation data can be obtained by using the locality data stored in the user database 536 to query the regulation database 535 for pertinent regulation data. As previously disclosed, the SDR kernel and regulation data may be combined into a single file or kept separate. The server system 530 may use either approach when sending the SDR kernel and regulation data to the client system 510.

Herein we have disclosed a variety of embodiments of an invention for modularly constructing an SDR. Methods for generating an SDR software component have been disclosed, some supporting the separation of the definition of the core DSP and control elements of an SDR software component (i.e., the SDR kernel component) which implement a particular radio standard from the host-dependent interface components. Instead, the SDR kernel component implements a simple interface that may be completely host-neutral. These methods permit developers of SDR software components to focus attention on implementing radio standards rather than wasting resources on building interfaces for a particular communication channel on a particular host. Additionally, with all developers of SDR kernels components implementing a common, simple interface it becomes possible to more easily swap one SDR kernel component with another while reusing the same interface components.

Further, we have disclosed a separation between the implementation of the core SDR software components (i.e., the SDR kernel component) on a particular host and the description thereof (i.e., the SDR kernel). This distinction is important because in some embodiments, an SDR kernel may be expressed in a format that is independent of a particular host whereas the SDR kernel component comprises host-specific instructions for implementing a radio standard. This separation is even more useful as it permits a host to effectively become a universal communicator, switching from one radio standard to another by using another SDR kernel. Such effortless modular construction of an SDR is further supported by an internet-based service we have disclosed, allowing users to select from a plurality of SDR kernels in a variety of ways.

What is claimed is:

1. A method for distributing an SDR (software defined radio) kernel comprising acts of:
   under control of a server system:
      receiving a locality identifier from a client system, the locality identifier identifying a particular geographic locality of the client system;
      accessing information indicating which geographic localities correspond to which radio standards, and identifying a particular radio standard corresponding to the particular geographic locality:
      selecting, from among a plurality of SDR kernels, an SDR kernel that corresponds to the particular radio standard; and
      sending to the client system the selected SDR kernel.

2. The method of claim 1, further comprising acts of:
   under control of a server system:
      receiving user authentication information from the client system;
      determining if the user authentication information matches authentication information for a registered user; and
      in response to a determination that the user authentication does not match the authentication information for a registered user, directing a user of the client system to register.

3. The method of claim 1, further comprising acts of:
   under control of a server system:
      prior to receiving the locality identifier from the client system, sending a list of locality identifiers to the client system, wherein the list of locality identifiers includes the received locality identifier;
      querying a locality database to generate a list of radio standard identifiers, each radio standard identifier identifying a particular radio standard used in a locality identified by the locality identifier;
      sending the list of radio standard identifiers to the client system;
      receiving a selected radio standard identifier from the client system;
      sending a list of SDR kernel identifiers to the client system, each SDR kernel identifier identifying an SDR kernel, the SDR kernel describing an SDR kernel component for implementing the particular radio standard identified by the selected radio standard identifier;

receiving a selected SDR kernel identifier from the client system; and
   wherein the SDR kernel sent to the client system comprises the SDR kernel identified by the selected SDR kernel identifier.

4. The method of claim 3, wherein pricing and publisher information are sent along with each SDR kernel identifier in the list of SDR kernel identifiers sent to the client system.

5. The method of claim 3, further comprising acts of:
under control of a server system:
   sending a list of payment options to the client system;
   receiving a selected payment option from the client system;
   obtaining account information for an account to be billed; and
   collecting payment from the account to be billed according to the selected payment option.

6. The method of claim 5, wherein the account information is obtained by receiving it from the client system.

7. The method of claim 5, wherein the account information is obtained by retrieving it from a database.

8. The method of claim 5, wherein the payment options include paying a fixed price for a finite duration of usage of the SDR kernel identified by the selected SDR kernel identifier.

9. The method of claim 5, wherein the payment options include paying a periodic fee for usage of the SDR kernel identified by the selected SDR kernel identifier.

10. The method of claim 5, wherein the payment options include paying a fixed price for an unlimited duration of usage of the SDR kernel identified by the selected SDR kernel identifier.

11. The method of claim 5, further comprising acts of:
under control of a server system:
   securing the SDR kernel identified by the selected SDR kernel identifier by encrypting it using a digital rights management ("DRM") component; and
   adding DRM policies to the secured SDR kernel, the DRM policies generated in part to enforce terms of the selected payment option.

12. A method for configuring a client system with an SDR kernel, the method comprising:
operating at least one processor in the client system:
   sending a locality identifier to a server system, the locality identifier indicating a geographic locality of the client system;
   receiving an SDR kernel from the server system based on the sent locality identifier;
   consulting regulations data related to allowed usage of frequency bands in the locality of the client system; and
   enabling the client system to communicate using the SDR kernel via a particular frequency based on the consulting of the regulations data.

13. The method of claim 12, further comprising:
operating the at least one processor in the client system:
receiving the regulations data from the server system based on the sent locality identifier.

14. A server system for sending an SDR kernel comprising:
data storage storing a plurality of SDR kernels and association information indicating which SDR kernels are associated with which geographic localities; and
a server engine constructed to:
   receive a locality identifier, the locality identifier identifying a particular geographic locality; and
   send an SDR kernel of the plurality of SDR kernels, wherein the sent SDR kernel is selected based at least in part on the received locality identifier, including searching for the locality identifier in the association information to find the SDK kernel.

15. The server system of claim 14, further comprising:
a data storage medium storing a plurality of locality identifiers;
a data storage medium storing a plurality of radio standard identifiers;
a data storage medium storing a plurality of SDR kernel identifiers, each of the SDR kernel identifiers identifying one of the plurality of SDR kernels;
a data storage medium storing a standard-kernel mapping of radio standard identifiers to SDR kernel identifiers, the kernel-standard mapping indicating which SDR kernels describe implementations of each radio standard; and
wherein the server engine is additionally constructed to:
   prior to receiving the received locality identifier, send a list of locality identifiers, wherein the list of locality identifiers includes the received locality identifier;
   send a list of radio standard identifiers;
   receive a selected radio standard identifier;
   send a list of SDR kernel identifiers associated with the selected radio standard identifier according to the standard-kernel mapping;
   receive a selected SDR kernel identifier; and
wherein the sent SDR kernel is identified by the selected SDR kernel identifier.

16. The server system of claim 15, further comprising:
a data storage medium storing a locality-standard mapping of locality identifiers to radio standard identifiers, the locality-standard mapping indicating radio standards typically used within each locality; and
wherein the sent list of radio standard identifiers comprises radio standard identifiers associated with the received locality identifier according to the locality-standard mapping.

17. The server system of claim 16, further comprising:
a data storage medium storing a locality-regulation mapping of locality identifiers to regulation data, the locality-regulation mapping effectively indicating regulations applicable to each locality;
a data storage medium storing user data, the user data including the last selected locality identifier; and
wherein the server engine is additionally constructed to send regulation data associated with the last selected locality identifier according to the locality-regulation mapping.

18. The server system of claim 14, further comprising:
a payment engine for processing financial transactions; and
wherein the server engine is additionally constructed to:
   send a list of payment options;
   receive a selected payment option;
   obtain account information; and
   send to the payment engine the obtained account information and the selected payment options for processing.

19. The server system of claim 18, further comprising:
a DRM engine for securing an SDR kernel, the DRM engine securing the SDR kernel in part according to the selected payment option; and
wherein the server engine is additionally constructed to send an SDR kernel identified by the selected SDR kernel identifier along with the selected payment option to the DRM engine.

20. The server system of claim 18, further comprising a data storage medium storing user data, the user data including account information; and wherein the obtained account information is retrieved from the user data.

* * * * *